(12) United States Patent
Braun et al.

(10) Patent No.: US 9,542,537 B2
(45) Date of Patent: Jan. 10, 2017

(54) METHOD AND SYSTEM FOR CONFIDENTIALLY PROVIDING SOFTWARE COMPONENTS

(75) Inventors: Michael Braun, Munich (DE); Markus Dichtl, Munich (DE); Bernd Meyer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 597 days.

(21) Appl. No.: 13/508,712

(22) PCT Filed: Oct. 14, 2010

(86) PCT No.: PCT/EP2010/065370
§ 371 (c)(1),
(2), (4) Date: Sep. 4, 2012

(87) PCT Pub. No.: WO2011/054643
PCT Pub. Date: May 12, 2011

(65) Prior Publication Data
US 2012/0321089 A1   Dec. 20, 2012

(30) Foreign Application Priority Data
Nov. 9, 2009   (DE) .................. 10 2009 052 454

(51) Int. Cl.
*G06F 21/10* (2013.01)
*H04L 9/32* (2006.01)

(52) U.S. Cl.
CPC ............. *G06F 21/10* (2013.01); *H04L 9/3247* (2013.01); *H04L 2209/60* (2013.01)

(58) Field of Classification Search
CPC ..... G06F 21/10; H04L 2209/60; H04L 9/3247
(Continued)

(56) References Cited

U.S. PATENT DOCUMENTS 5,765,152 A * 6/1998 Erickson ................. G06F 21/10
6,105,134 A * 8/2000 Pinder ..................... H04L 63/04
                                                      348/E5.004
(Continued)

FOREIGN PATENT DOCUMENTS

CN    1409395    4/2003
CN    1462397    12/2003
(Continued)

OTHER PUBLICATIONS

Schneier, B.: Angewandte Kryptographie, Addison Wesley, 1996, pp. 520-524; Book.

*Primary Examiner* — James Turchen
(74) *Attorney, Agent, or Firm* — Cozen O'Connor

(57) ABSTRACT

A method and system for confidentially providing a software component which is encrypted using a secret cryptographic key of a software component manufacturer, and the key is then encrypted using a first cryptographic system key, wherein the encrypted software component and the encrypted key are transported by the software component manufacturer to a destination system device. After decrypting the transported encrypted key using a second cryptographic system key, the transported encrypted software component is decrypted using the decrypted key, wherein the decrypted software component is provided for execution on the destination system device. The method can be used to protect source codes or object codes of a developed software component from access by a third party and still allows for processing using standard tools.

19 Claims, 2 Drawing Sheets

(58) Field of Classification Search
USPC ........................................................ 380/282
See application file for complete search history.

(56) References Cited

U.S. PATENT DOCUMENTS

| | | | | |
|---|---|---|---|---|
| 6,550,011 | B1* | 4/2003 | Sims, III | G06F 21/10 |
| | | | | 365/52 |
| 6,615,350 | B1* | 9/2003 | Schell | G06F 21/33 |
| | | | | 380/30 |
| 6,883,030 | B1* | 4/2005 | Leins | G05B 23/0267 |
| | | | | 398/109 |
| 6,914,985 | B1* | 7/2005 | Shrader | G06F 21/6209 |
| | | | | 380/29 |
| 7,051,005 | B1 | 5/2006 | Peinado et al. | |
| 7,133,524 | B2 | 11/2006 | Fujiwara et al. | |
| 7,203,844 | B1* | 4/2007 | Oxford | G06F 21/10 |
| | | | | 380/269 |
| 7,747,851 | B1* | 6/2010 | Robinson | G06F 21/10 |
| | | | | 713/156 |
| 2002/0007456 | A1* | 1/2002 | Peinado | G06F 21/10 |
| | | | | 713/164 |
| 2002/0129240 | A1 | 9/2002 | Sussmann | |
| 2002/0194492 | A1 | 12/2002 | Choi et al. | |
| 2003/0074571 | A1 | 4/2003 | Fujiwara et al. | |
| 2003/0097189 | A1* | 5/2003 | Melzer | G05B 19/0428 |
| | | | | 700/17 |
| 2003/0210789 | A1* | 11/2003 | Farnham | H04L 9/0844 |
| | | | | 380/270 |
| 2004/0027235 | A1* | 2/2004 | Steindl | H04L 1/1803 |
| | | | | 340/3.42 |
| 2004/0098348 | A1 | 5/2004 | Kawasaki et al. | |
| 2005/0025182 | A1* | 2/2005 | Nazari | H04W 88/06 |
| | | | | 370/469 |
| 2005/0033974 | A1 | 2/2005 | Ansell et al. | |
| 2005/0091496 | A1* | 4/2005 | Hyser | G06F 21/575 |
| | | | | 713/175 |
| 2005/0246763 | A1* | 11/2005 | Corcoran | G06F 21/10 |
| | | | | 726/3 |
| 2006/0123025 | A1 | 6/2006 | DeMello et al. | |
| 2007/0067634 | A1* | 3/2007 | Siegler | G06F 21/31 |
| | | | | 713/171 |
| 2007/0143216 | A1* | 6/2007 | Benaloh | G06F 21/10 |
| | | | | 705/51 |
| 2007/0204349 | A1* | 8/2007 | Sparks | G06Q 30/06 |
| | | | | 726/27 |
| 2008/0010470 | A1* | 1/2008 | McKeon | G06F 21/51 |
| | | | | 713/194 |
| 2008/0272934 | A1* | 11/2008 | Wang | H02J 3/14 |
| | | | | 340/870.11 |
| 2008/0301440 | A1* | 12/2008 | Plouffe, Jr. | G06F 21/51 |
| | | | | 713/164 |
| 2008/0301468 | A1* | 12/2008 | Murase | G06F 12/1458 |
| | | | | 713/193 |
| 2009/0164804 | A1* | 6/2009 | Mardiks | H04L 9/14 |
| | | | | 713/193 |
| 2010/0011200 | A1* | 1/2010 | Rosenan | G06F 21/575 |
| | | | | 713/2 |
| 2010/0275251 | A1* | 10/2010 | Gross | H04L 63/062 |
| | | | | 726/6 |
| 2011/0055546 | A1* | 3/2011 | Klassen | G06F 21/305 |
| | | | | 713/150 |
| 2011/0211690 | A1* | 9/2011 | Tu | H04L 9/0863 |
| | | | | 380/44 |
| 2011/0305338 | A1* | 12/2011 | Rogan | H04W 12/02 |
| | | | | 380/270 |

FOREIGN PATENT DOCUMENTS

| | | |
|---|---|---|
| CN | 1462397 | 6/2014 |
| DE | 19614654 | 8/1997 |
| DE | 100 38 779 | 3/2002 |
| DE | 100 59 230 | 6/2002 |
| EP | 0 795 809 | 9/1997 |

* cited by examiner

METHOD AND SYSTEM FOR CONFIDENTIALLY PROVIDING SOFTWARE COMPONENTS

CROSS-REFERENCE TO RELATED APPLICATIONS

This is a U.S. national stage of application No. PCT/EP2010/065370 filed 14 Oct. 2010. Priority is claimed on German Application No. 10 2009 052 454.1 filed 9 Nov. 2009, the content of which is incorporated herein by reference in its entirety.

BACKGROUND OF THE INVENTION

1. Field of the Invention

The invention relates to data processing and, more particularly, to a method and system for confidentially providing software components comprising original equipment manufacturer (OEM) software components.

2. Description of the Related Art

Development tools can be used to develop or produce software components. Software components or software modules can, for example, be program sections or subprograms. These software components are created with the aid of a development environment by a software component manufacturer or original equipment manufacturer (OEM). During the creation or programming of software components, a source code of the software component is developed. Software component manufacturers or OEMs incorporate their sector-specific special knowledge or their know-how in the creation of software components. To prevent third parties having access to this internal know-how, software component manufacturers attempt to protect the software components contained in the source code against read access.

SUMMARY OF THE INVENTION

It is therefore an object of the present invention to provide a method and a system for confidentially providing one or more software components which reliably prevent read access to the respective software component and simultaneously permit processing with standard tools.

This object and other objects and advantages are achieved in accordance with the invention by a method for confidentially providing a software component comprising (a) encryption of the software component (SWK) using a secret cryptographic OEM key ($K_{OEM}$) of a software component manufacturer (OEM), (b) encryption of the OEM key (KOEM) using a first cryptographic system key ($K_{sys1}$), (c) transportation of the encrypted software component (ENC-SWK) and the encrypted OEM key (ENC-$K_{OEM}$) by the software component manufacturer (OEM) to a destination system device, (d) decryption of the transported encrypted OEM key (ENC-$K_{OEM}$) using a second cryptographic system key ($K_{sys2}$), and (e) decryption of the transported encrypted software component (ENC-SWK) using the decrypted OEM key ($K_{OEM}$), where the decrypted software component (SWK) is provided for execution on the destination system device.

In one embodiment of the method in accordance with the invention, the first cryptographic system key is a public cryptographic key and the second cryptographic system key is a private cryptographic key of an asymmetric encryption method.

In an alternative embodiment of the method in accordance with the invention, the first cryptographic system key and the second cryptographic system key are private cryptographic keys of a symmetric encryption method.

In one possible embodiment of the method, the destination system device comprises a stored-program control unit.

In one embodiment of the method, the first cryptographic system key and the second cryptographic system key are generated as a key pair by a manufacturer of the destination system device.

In another embodiment the software component is symmetrically encrypted using the secret cryptographic OEM key of the software component manufacturer OEM.

In another embodiment the secret cryptographic OEM key of the software component manufacturer OEM is asymmetrically encrypted using the public cryptographic key.

In another embodiment of the method in accordance with the invention, the private key is integrated in a manipulation-proof manner in the destination system device.

In a still further embodiment, upon encryption of the software component, a cryptographic checksum is generated, which is checked on the decryption of the transported encrypted software component.

In yet another embodiment, the cryptographic checksum comprises a message authentication code (MAC).

In an alternative embodiment, the cryptographic checksum comprises an electronic signature.

In a further embodiment, the encrypted software component and the encrypted OEM key of the software component manufacturer OEM are transported stored on a data carrier.

In an alternative embodiment, the encrypted software component and the encrypted OEM key of the software component manufacturer OEM are transported in data packets over a network.

In one possible embodiment, a software component is encrypted using the secret cryptographic OEM key of the software component manufacturer OEM.

In a further embodiment, a plurality of software components are encrypted simultaneously using the secret cryptographic OEM key of the software component manufacturer OEM.

It is a further object of the invention to provide a system for confidentially providing software components (SWK) for a user comprising at least one development device of a software component manufacturer (OEM) on which a development tool can be used to produce software components (SWK), which are each encrypted by a secret cryptographic OEM key ($K_{OEM}$) of the software component manufacturer (OEM), where the secret cryptographic OEM key ($K_{OEM}$) of the software component manufacturer (OEM) is encrypted by a first cryptographic system key ($K_{sys1}$) and transported together with the encrypted software component (ENC-SWK) to a destination system device, which, with the aid of a second cryptographic system key ($K_{sys2}$), initially decrypts the transported encrypted OEM key (ENC-$K_{OEM}$) of the software component manufacturer (OEM) and then decrypts the transported encrypted software component (ENC-SWK) using the decrypted OEM key ($K_{OEM}$) of the software component manufacturer (OEM), and where the decrypted software component (SWK) is provided for execution on the destination system device.

In one embodiment of the system, the destination system device comprises a stored-program controller in which the private key generated by the manufacturer of the destination system device is provided.

In another embodiment of the system, the OEM development device of the software component manufacturer is connected over a network with the destination system device.

In a further embodiment of the system, the software component comprises at least one program executable on the destination system device.

It is also an object of the invention to provide a destination system device comprising a first decryption unit, which decrypts a transported encrypted OEM key (KOEM) of a software component manufacturer (OEM) using a second cryptographic system key ($K_{sys2}$), a second decryption unit, which decrypts a transported encrypted software component (ENC-SWK) using the OEM key ($K_{OEM}$) of the software component manufacturer (OEM) decrypted by the first decryption unit and with an execution unit, which executes the software component (SWK) decrypted by the second decryption unit.

In an embodiment of the destination system device in accordance with the invention, the destination system device comprises at least one interface for receiving transported encrypted software components and encrypted OEM keys of a software component manufacturer.

In another embodiment of the destination system device, the destination system device comprises peripheral components for sensors and actuators, which are connected by a bus with the execution unit of the destination system device.

In a further embodiment of the destination, the second cryptographic system key is a private cryptographic key of an asymmetric key method.

It is a further object of the invention to provide a development device of a software component manufacturer comprising a first encryption unit for encrypting a software component (SWK) using a secret cryptographic OEM key ($K_{OEM}$) of the software component manufacturer (OEM), and a second encryption unit for encrypting the cryptographic OEM key of the software component manufacturer (OEM) using a first cryptographic system key ($K_{sys1}$), where the encrypted software component (ENC-SWK) and the encrypted OEM key (ENC-$K_{OEM}$) of a destination system device are provided.

In an embodiment of the development device in accordance with the invention, the first cryptographic system key is a public cryptographic key of an asymmetric encryption method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes preferred embodiments of the method and system according to the invention for confidentially providing a software component with reference to the attached figures, in which.

DETAILED DESCRIPTION OF THE PREFERRED EMBODIMENTS

Figure 1:
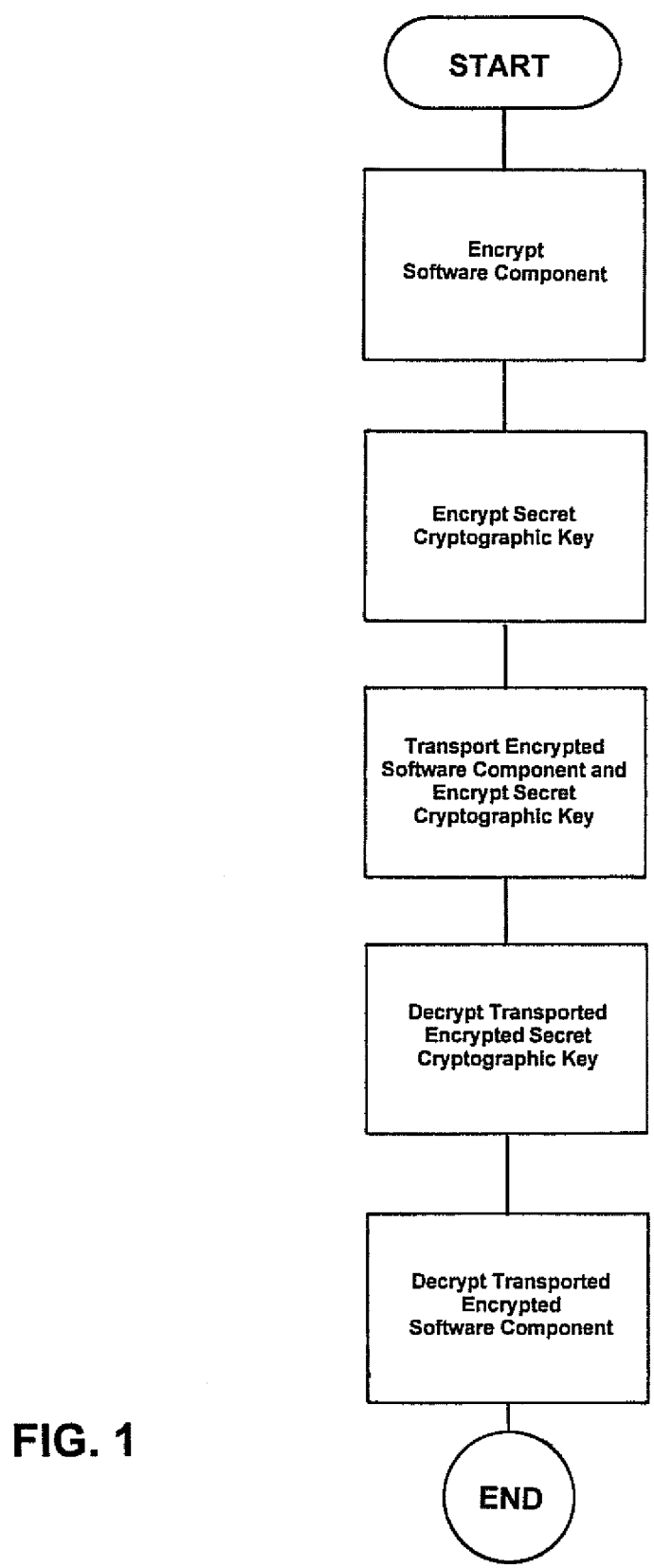
FIG. 1 is a flow chart depicting a possible embodiment of the method in accordance with the invention for confidentially providing a software component.

Shown in FIG. 1 is a flow chart of the method in accordance with the invention for confidentially providing a software component which substantially comprises five steps S1-S5.

In a first step S1, the software component SWK is encrypted using a secret cryptographic OEM key $K_{OEM}$ of a software component manufacturer OEM.

Then, in a step S2, the OEM key $K_{OEM}$ of the software component manufacturer OEM is encrypted using a first cryptographic system key $K_{sys1}$.

In a further step, the encrypted software component ENC-SWK and the encrypted OEM key (ENC-$K_{OEM}$) are transported by the software component manufacturer OEM to a destination system device. This destination system device is formed, for example, by a stored-program control unit SPC. In one possible embodiment, the encrypted software component ENC-SWK and the encrypted OEM key ENC-$K_{OEM}$ are transported on a data carrier, which stores the encrypted software component and the encrypted OEM key. In an alternative embodiment, the encrypted software component and the encrypted OEM key of the software component manufacturer OEM are transported in data packets over a network.

In a further step S4, the decryption of the transported encrypted OEM key ENC-$K_{OEM}$ is performed using a second cryptographic system key $K_{sys2}$.

In a further step S5, the transported encrypted software component ENC-SWK is decrypted using the decrypted OEM key $K_{OEM}$, where the decrypted software component SWK is provided for execution on the destination system device, for example, stored-program controller SPC.

In a preferred embodiment of the method in accordance with the invention, the first cryptographic system key $K_{sys1}$ and the second cryptographic system key $K_{sys2}$ are generated as a key pair by a manufacturer of the destination system device. In one possible embodiment of the method, the encryption and decryption is performed using an asymmetric encryption method, where the first cryptographic system key $K_{sys1}$ is a public cryptographic key $K_{pub}$ and the second cryptographic key $K_{sys2}$ is a private cryptographic key $K_{priv}$.

In an alternative embodiment, the encryption and decryption is performed using a symmetric encryption method, where the first cryptographic system key $K_{sys1}$ and the second cryptographic system key $K_{sys2}$ are private cryptographic keys.

In one embodiment, the encryption of the software component SWK using the secret cryptographic OEM key $K_{OEM}$ of the software component manufacturer OEM in step S1 occurs symmetrically. The encryption of the secret cryptographic OEM key $K_{OEM}$ of the software component manufacturer OEM using the public cryptographic key $K_{pub}$ occurs asymmetrically. Here, the decryption on the destination system device is performed using a private key $K_{priv}$, which is integrated in a manipulation-proof manner in the destination system device, such as in the stored-program control unit SPC.

In one embodiment, upon encryption of the software component SWK in Step S1, a cryptographic checksum is generated, which is checked upon decryption of the transported encrypted software component ENC-SWK. This cryptographic checksum can, for example, be formed by a message authentication code MAC.

In an alternative embodiment, the cryptographic checksum is formed by an electronic signature.

In another embodiment, in a step S1, a software component SWK is encrypted using a secret cryptographic OEM key of the software component manufacturer OEM. In one embodiment, the secret cryptographic OEM key of the software component manufacturer OEM simultaneously encrypts a plurality of software components SWK.

Figure 2:
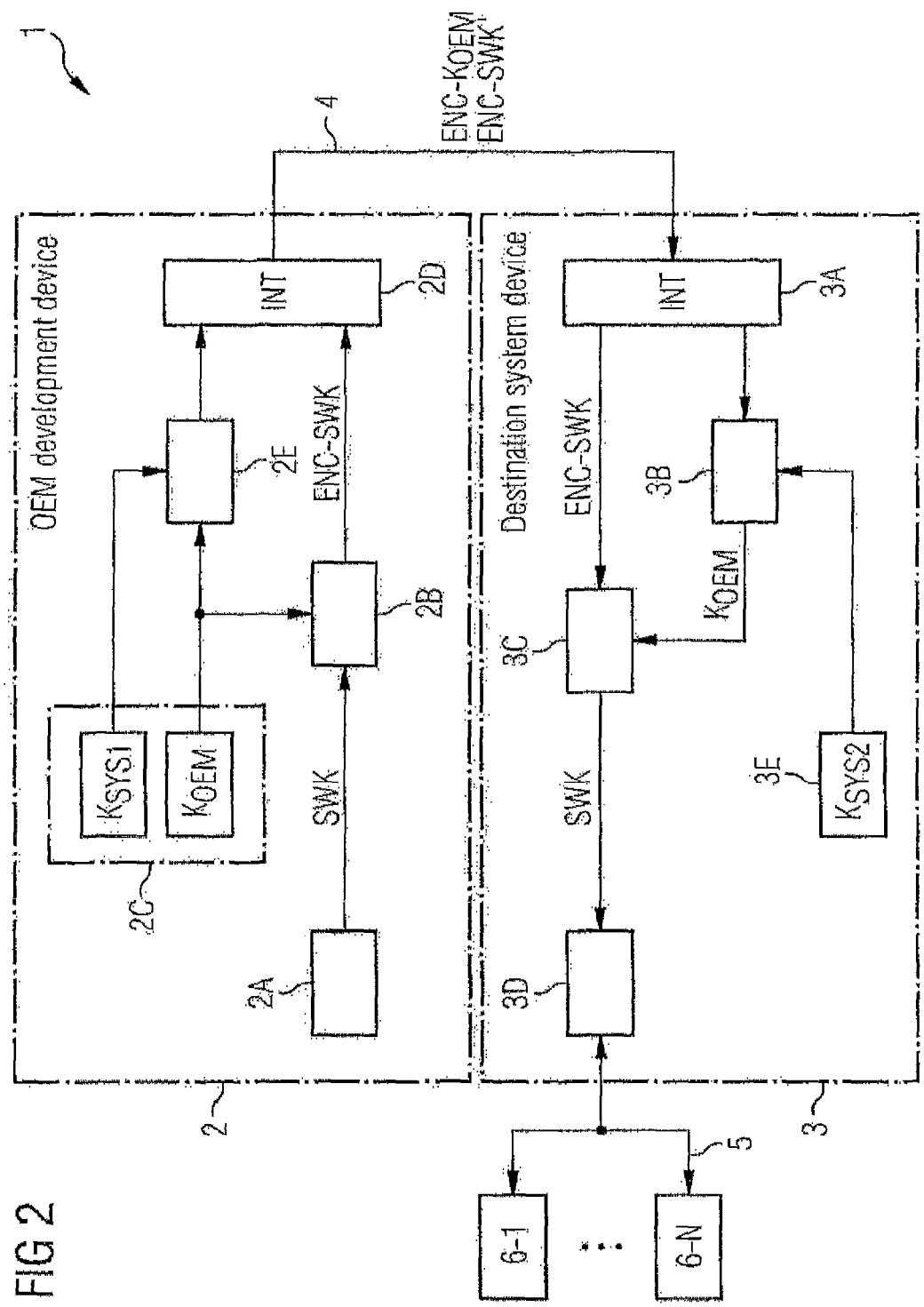
FIG. 2 is a schematic block diagram depicting a possible embodiment of a system in accordance with the invention for confidentially providing software components for a user.

FIG. 2 shows a schematic block diagram of an embodiment of a system 1 in accordance with the invention for confidentially providing software components SWK for a user. The system 1 contains at least one development arrangement 2 of a software component manufacturer OEM and a destination system device 3, which comprises, for example, a stored-program controller SPC. The OEM development environment 2 of the software component manufacturer OEM contains at least one development device 2A, on which software components SWK can be produced using a development tool. These software components can be any software component or software modules, i.e., programs, sub-programs or subroutines or even files.

The development environment 2 of the software component manufacturer contains a first encryption unit 2B, by which the software component SWK supplied is encrypted using a secret cryptographic OEM key $K_{OEM}$ of the software component manufacturer OEM. This first encryption unit 2B can encrypt one software component or simultaneously a plurality of software components using the secret cryptographic OEM key of the software component manufacturer. The secret cryptographic OEM key $K_{OEM}$ of the software component manufacturer is located, as shown in FIG. 2, for example, in a memory 2C of the OEM development environment 2. The software component SWK is preferably symmetrically encrypted using the secret cryptographic OEM key $K_{OEM}$ of the software component manufacturer OEM in the encryption unit 2B and reaches an interface 2D of the OEM development environment 2.

As shown in FIG. 2, in addition to the first encryption unit 2B, the OEM development environment 2 comprises a second encryption unit 2e. In the second encryption unit 2E, the secret cryptographic OEM key of the software component manufacturer OEM read from the memory 2C is encrypted by a first cryptographic system key $K_{sys1}$. The secret OEM key of the software component manufacturer OEM encrypted by the second encryption unit 2E and the software component ENC-SWK encrypted by the first encryption unit 2B are transported over the interface 2D of the OEM development environment 2 through a transport device 4 to an interface 3A of a destination system device 3. The destination system device 3 is, for example, a stored-program controller SPC. In the exemplary embodiment shown in FIG. 2, the transport device 4 is formed by a line or a network. With this embodiment, the encrypted software component ENC-SWK and the encrypted OEM key ENC-$K_{OEM}$ of the software component manufacturer OEM are transported in data packets over the network to the destination system device 3.

In an alternative embodiment, the transport device 4 is a data carrier on which the encrypted software component ENC-SWK and the encrypted OEM key ENC-$K_{OEM}$ are stored. With this embodiment, the encrypted OEM key and the encrypted software component ENC-SWK are written or stored on the data carrier by the interface 2D. With this embodiment, the interface 3A of the destination system device 3 reads the encrypted OEM key ENC-$K_{OEM}$ stored on the data carrier and the encrypted software component ENC-SWK from the data carrier.

The destination system device 3 comprises a first decryption unit 3B, which decrypts the transported encrypted OEM key ENC-$K_{OEM}$ using a second cryptographic system key $K_{sys2}$. The OEM key $K_{OEM}$ of the software component manufacturer OEM generated or decrypted in this way is provided by the first decryption unit 3B of a second decryption unit 3C of the destination system device 3. The second decryption device 3C of the destination system device 3 then decrypts the transported or received software component ENC-SWK using the decrypted OEM key $K_{OEM}$ and provides the decrypted software component SWK for execution on the destination system device 3. In one embodiment, the destination system device 3 comprises an execution unit 3D which is connected by a bus 5 with peripheral components 6-1 to 6-$n$ for sensors and actuators. The execution unit 3D is, for example, a CPU or a microprocessor. The software component SWK recovered from the second decryption unit 3C can, for example, comprise an executable program or sub-program, which is executed directly after the decryption by the execution unit 3D of the destination system device 3.

In an embodiment of the system 1 in accordance with the invention for confidentially providing software components SWK, the first cryptographic system key $K_{sys1}$ stored in the memory 2C is a public cryptographic key $K_{pub}$. With this embodiment, the second cryptographic system key $K_{sys2}$ stored in a storage device 3E of the destination system device 3 is a private cryptographic key $K_{priv}$. This private key $K_{priv}$ is preferably integrated in the destination system device 3 in a manipulation-proof manner. In an alternative embodiment of the system 1 in accordance with the invention, the first cryptographic system key $K_{sys1}$ stored in the memory 2C and the second cryptographic system key $K_{sys2}$ stored in the memory 3E of the destination device 3 are private cryptographic keys of a symmetric encryption method. In both embodiments, the first cryptographic system key $K_{sys1}$ and the second cryptographic system key $K_{sys2}$ are generated as a key pair, preferably by a manufacturer of the destination system device 3.

The method and system in accordance with the disclosed embodiments the invention for confidentially providing software modules or software components SWK provides protection against unauthorized reading and manipulation by using cryptographic encryption and decryption methods. The disclosed embodiments of the method and system confidentially provide software components SWK, which are developed, where protection of the know-how in the software components is achieved in that unauthorized third parties are unable to read or change in an unnoticed way the software component SWK either in clear text or as a source code or object code.

With the method and system in accordance with the disclosed embodiments of the invention, two-stage encryption and two-stage decryption are performed, where the encrypted OEM key ENC-$K_{OEM}$ of the software component manufacturer OEM are transported together using the software component ENC-SWK encrypted by the OEM key to the destination system device 3.

Before delivery of the destination system device or SPC hardware and the development environment 2, first the corresponding system keys $K_{sys1}$, $K_{sys2}$ are initially generated. This can be performed, for example, by the manufacturer of the destination system device 3. In this case, the manufacturer of the destination system device 3 files the second system key $K_{sys2}$, preferably in a manipulation-proof manner, for example, in a particularly protected memory 35.

The first system key $K_{sys1}$, which is used to encrypt the OEM key of the software component manufacturer, is stored in a memory 2C of the development environment 2. In order to organize the key transport as simply as possible, in one embodiment, the public or first system key $K_{sys1}$ can be delivered directly with the development environment 2 to the software component manufacturer OEM. The second system key, for example, a private key, is preferably stored in a manipulation-proof manner, for example in firmware of the destination system device 3.

A software component manufacturer OEM, who uses the development device 2 to develop software modules or software component SWK, first requires a secret OEM key, which can be individually selected for a software component SWK or obtained by derivation from a master key. In order to protect the software component SWK developed by the software component manufacturer OEM, the software component manufacturer OEM encrypts the software module or the software component using the cryptographic software integrated in the development environment 2 using the OEM key of the software component manufacturer OEM. In an embodiment, the encryption is performed symmetrically because this enables a higher performance to be achieved than with an asymmetric encryption method. In particular, with the later decryption of the software protection in the destination system device 3, the use of a symmetric encryption method achieves much quicker decryption.

The secret text formed by the symmetric encryption can no longer be read without knowledge of the corresponding key. The OEM key used for the encryption is in turn encrypted with a first system key $K_{sys1}$ so that this OEM key is not present in clear text and hence also cannot be used for the decryption of the previously encrypted OEM software components. The encrypted software or software component SWK can now be delivered or transported together with the encrypted OEM key. After the delivery of the encrypted OEM software component together with the encrypted OEM key, these two data packets can be loaded into the destination system device 3 or the SPC hardware. The SPC hardware or the destination system device 3 contains the second system key in a key memory 3E from the delivery of the hardware. This second system key $K_{sys2}$ can, for example, be a private key. This private key $K_{sys2}$ is now used to decrypt the OEM key. Following this, the software modules or the software components SWK are decrypted, preferably using symmetric decryption, using the OEM key. As a result, the software component SWK is provided for execution in clear text in the SPC hardware.

With the method and system in accordance with the disclosed embodiments of the invention, the software component manufacturer OEM can protect its generated software modules or software components SWK and remove this protection again without any interaction between the software component manufacturer OEM and the manufacturer of the destination system device 3 being required. A customer of the software component manufacturer OEM or component manufacturer is not able to decrypt the software components, which means that the protection of the know-how of a software component manufacturer OEM cannot be removed by a customer or another software component manufacturer. Due to the fact that the software modules or software components of a software component manufacturer OEM are encrypted, the delivery of this software or these software components can also occur over non-secure channels. For example, the software component can be sent in electronic form by internet download or also in a memory card MMC. Hence, with the method and system in accordance with the disclosed embodiments of the invention, the protection of know-how is not dependent on the security of the transport channel 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for confidentially providing a software component comprising:
   (a) encrypting the software components symmetrically using a secret cryptographic key of a software component manufacturer;
   (b) encrypting the secret cryptographic key symmetrically using a first cryptographic system key;
   (c) transporting the encrypted software component and the encrypted secret cryptographic key by the software component manufacturer to a stored-program controller comprising an executor connected by a system bus to externally and separately located peripheral components for sensors and actuators;
   (d) decrypting the transported encrypted secret cryptographic key symmetrically using a second cryptographic system key which is stored in firmware of the stored-program controller comprising the executor connected by the system bus to the externally and separately located peripheral components for sensors and actuators; and
   (e) decrypting the transported encrypted software component symmetrically using the decrypted secret cryptographic key;
      wherein the decrypted software component is provided for execution on the stored-program controller comprising the executor connected by the system bus to the externally and separately located peripheral components for sensors and actuators; and
      wherein the first cryptographic system key and the second cryptographic system key are generated as a key pair by a manufacturer of the stored-program controller comprising the executor connected by the system bus to externally located peripheral components for sensors and actuators.

2. The method as claimed in claim 1, wherein the first cryptographic system key and the second cryptographic system key are private cryptographic keys of a symmetric encryption method.

3. The method as claimed in claim 2, wherein the second cryptographic system key is integrated in the stored program controller in a manipulation-proof manner.

4. The method as claimed in claim 1, wherein, upon the encryption of the software component, a cryptographic checksum is generated and checked upon the decryption of the transported encrypted software component.

5. The method as claimed in claim 4, wherein the cryptographic checksum comprises a message authentication code.

6. The method as claimed in claim 4, wherein the cryptographic checksum comprises an electronic signature.

7. The method as claimed in claim 1, wherein the encrypted software component and the encrypted key of the software component manufacturer are transported stored on a data carrier.

8. The method as claimed in claim 1, wherein the encrypted software component and the encrypted key of the software component manufacturer are transported in data packets over a network.

9. The method as claimed in claim 1, wherein the secret cryptographic key of the software component manufacturer is used to encrypt one of a software component and a plurality of software components simultaneously.

10. A system for confidentially providing software components for a user, comprising:
   at least one development device of a software component manufacturer on which a development tool is utilizable to produce software components which are each symmetrically encrypted by a secret cryptographic key of the software component manufacturer; and
   a stored-program controller comprising an executor connected by a system bus to externally and separately located peripheral components for sensors and actuators,
   the secret cryptographic key of the software component manufacturer being encrypted symmetrically by a first cryptographic system key and transported together with the symmetrically encrypted software component from the at least one development device to the stored-program controller, the stored-program controller being configured to initially utilize a second cryptographic system key which is stored in firmware of the stored-program controller to decrypt the transported encrypted key of the software component manufacture, and subsequently decrypt the transported encrypted software component symmetrically using the decrypted key of the software component manufacturer;
   wherein the decrypted software component is provided for execution on the stored-program controller comprising the executor connected by the system bus to the externally and separately located peripheral components for sensors and actuators; and
   wherein the first cryptographic system key and the second cryptographic system key are generated as a key pair by a manufacturer of the stored-program controller comprising the executor connected by the system bus to externally located peripheral components for sensors and actuators.

11. The system as claimed in claim 10, wherein the second cryptographic system key is a private key generated by the manufacturer of the destination system device provided in the stored-program controller comprising the executor connected by the system bus to the externally and separately located peripheral components for sensors and actuators.

12. The system as claimed in claim 10, wherein the development device of the software component manufacturer is connected over a network with the stored-program controller comprising the executor connected by the system bus to the externally and separately located peripheral components for sensors and actuators.

13. The system as claimed in claim 11, wherein the development device of the software component manufacturer is connected over a network with the stored-program controller comprising the executor connected by the system bus to the externally and separately located peripheral components for sensors and actuators.

14. The system as claimed in claim 10, wherein the software component comprises at least one program which is executable on the stored-program controller comprising the executor connected by the system bus to the externally and separately located peripheral components for sensors and actuators.

15. A destination system device comprising:
   a stored-program controller, comprising:
      a first decryptor which decrypts a transported encrypted key of a software component manufacturer symmetrically using a cryptographic system key which is stored in firmware of the stored-program controller;
      a second decryptor which decrypts a transported encrypted software component symmetrically using the transported key of the software component manufacturer decrypted by the first decryptor; and
      an executor connected by a system bus to externally and separately located peripheral components for sensors and actuators, said executor executing the software component decrypted by the second decryptor;
      wherein the cryptographic system key is generated with another cryptographic system key as a key pair by a manufacturer of the stored-program controller connected by the system bus to externally located peripheral components for sensors and actuators via the executor.

16. The stored-program controller as claimed in claim 15, further comprising:
   at least one interface which receives transported encrypted software components and encrypted keys of a software component manufacturer.

17. The stored-program controller as claimed in claim 15, wherein the externally and separately located peripheral components for the sensors and actuators are connected by the bus to the executor.

18. A development device of a software component manufacturer, comprising:
   a first encryptor which encrypts a software component symmetrically using a secret cryptographic key of the software component manufacturer;
   a second encryptor which encrypts the secret cryptographic key of the software component manufacturer symmetrically using a first cryptographic system key; and
   an interface via which the symmetrically encrypted software component and the symmetrically encrypted secret cryptographic key are provided to a stored-program controller including a second cryptographic system key and comprising an executor connected by a system bus to externally and separately located peripheral components for sensors and actuators;
   wherein the first cryptographic system key and the second cryptographic system key are generated as a key pair by a manufacturer of the stored-program controller comprising the executor connected by the system bus to externally located peripheral components for sensors and actuators.

19. The development device as claimed in claim 18, wherein the first cryptographic system key and the second cryptographic system key are private cryptographic keys of a symmetric encryption method.

* * * * *